United States Patent [19]

Hayahara et al.

[11] Patent Number: 4,913,198

[45] Date of Patent: Apr. 3, 1990

[54] SYSTEM FOR AUTOMATIC DISPENSATION OF DYE SOLUTION

[75] Inventors: Takuro Hayahara, Toyonaka; Keijiro Kuratani; Takumi Yukiue, both of Okayama; Hiroshi Inoue, Okayama, all of Japan

[73] Assignees: Japan Exlan Company, Ltd.; Excom Co., Ltd., both of Osaka, Japan

[21] Appl. No.: 179,217

[22] Filed: Apr. 8, 1988

[30] Foreign Application Priority Data

Oct. 5, 1987 [JP] Japan .................................. 62-251844

[51] Int. Cl.⁴ .............................................. B65B 3/28
[52] U.S. Cl. ...................................... 141/83; 141/172; 141/237; 141/103; 141/153
[58] Field of Search ............... 141/83, 104, 103, 100, 141/153, 157, 159, 156, 172, 237, 238, 242, 243; 177/146

[56] References Cited

U.S. PATENT DOCUMENTS

| | | | |
|---|---|---|---|
| 3,447,906 | 6/1969 | Zimmerli | 141/83 |
| 3,990,212 | 11/1976 | Flovin | 141/83 |
| 4,060,109 | 11/1977 | Sotoma | 141/83 |
| 4,585,148 | 4/1986 | Ito | 141/83 |
| 4,630,654 | 12/1986 | Kennedy, Jr. | 141/83 |
| 4,676,282 | 6/1987 | Bellini et al. | 141/83 |

FOREIGN PATENT DOCUMENTS

55-122068 9/1980 Japan .
56-159342 12/1981 Japan .
57-66171 4/1982 Japan .

Primary Examiner—Henry J. Recla
Assistant Examiner—Edward L. Donovan
Attorney, Agent, or Firm—Wenderoth, Lind & Ponack

[57] ABSTRACT

A system for the automatic dispensation of dye solutions characterized in that it is provided with a plurality of weighing devices for converting weight changes of dye solution materials supplied to receiving containers into electric signals. A control system for controlling the quantities of material supply, and for repeating a dispensing operation continuously for a plural number of times, the dispensing operation forming one cycle consisting of [I] setting the receiving container in a fixed position, [II] placing the receiving container onto the weighing device, [III] supplying the material to the predetermined receiving container and weighing the material, [IV] releasing the receiving container from the weighing device, and [V] transferring the receiving container. This system increases to a maximum, the range of the dye solutions that can be dispensed and the dispensing speed so as to reduce the cost and floor space occupied.

3 Claims, 5 Drawing Sheets

SYSTEM FOR AUTOMATIC DISPENSATION OF DYE SOLUTION

BACKGROUND OF THE INVENTION (a) Field of the Invention:

The present invention relates to a system that can automatically dispense (prepare) a plurality of dye solutions for color matching of various colors at high precision (accuracy) and high efficiency by mixing barious kinds of materials at optional ratios according to the particular object.

(b) Description of the Prior Art:

As regards the preparation or dispensation of dye solutions, it has been common practice heretofore to empirically select several kinds of dyes composing the color of the desired color sample, thereby to prepare a dye solution in which a coth is dyed, and then to compare the dyed color with the color sample and decide the final recipe of the dye solution, after repeating this operation several times or more, if necessary. In recent years, a method generally called computer color matching (CCM) has been developed, by which color matching is performed by the utilization of a spectrophotometer and a digital computer.

By this CCM method, it has become rapid and easy to analyze a color sample and to express the color sample by dye concentrations based on the three primary colors. However, it is inevitably necessary for the color matching operation to select proper dyes based on the three primary colors thus expressed, from many dyes sold on the market, considering the quality and economy of the dyed products such as color fastness and costs, and to examine the perfect coincidence of the dyed color with the color sample by the naked eye. It is the present situation that the operation of preparing or dispensing a dye solution with selected dyes relies on handwork, and this work requires long experience and great skill as well as a lot of time and labor.

Under such a situation, various sytems for performing the above mentioned dispensing operation automatically have been proposed in recent years. These include the so-called volume method based on the measurement of the volumes of stock dye solutions, etc. as described in Japanese Patent Kokai (Laid-open) No. 122068/1980 and No. 66171/1982, and the so-called weight method which is based on the measurement of the weight of stock dye solutions, etc. as described in Japanese Patent Kokai (Laid-open) No. 159342/1981.

In the above-mentioned volume method, although it contributes to high speed operation and labor saving, errors are liable to occur resulting from volume changes which accompany temperature variations, mixing of air bubbles, etc. and therefore problems remain unsolved with respect to precision.

On the other hand, in the weight method, higher precision dispensing is possible in contrast to the volume method. However, since the materials such as stock dye solutions, etc. must be weighed one by one with a single electronic balance, problems remain unsolved with respect to the increase of dispensation efficiency.

Therefore, the object of the present invention is to provide a system which makes it possible to automatically dispense (compound) dye solutions for color matching use of a great variety of colors at high precision and high efficiency.

SUMMARY OF THE INVENTION

In a system for automatic dispensation of a plurality of dye solution materials including stock dye solutions, dyeing auxiliaries, water, etc., the object of the present invention is attained by a system for the automatic dispensation of dye solutions, which is provided with one or more material supply means connected to their respective material containers, a plurality of receiving containers for receiving the materials, transfer means on which the receiving containers are placed, two or more weighing means for converting weight changes of the materials supplied to the receiving containers into electric signals, lifting and lowering means for moving the weighing means up and down, means for determining the positions of material supply corresponding to predetermined values, control means for the quantities of material supply, control means for repeating dispensing operation continuously for a plural number of times, said dispensing operation forming one cycle consisting of [I] setting the receiving container in a fixed position, [II] placing the receiving container onto the weighing means by lifting the weighing means, [III] supplying the material to the predetermined receiving container and weighing the material, [IV] releasing the receiving container from the weighing means by lowering the weighing means, and [V] transferring the receiving container.

The invention will be explained in more detail in the following by referring to the accompanying drawings wherein.

DETAILED DESCRIPTION OF THE INVENTION

In the following, the present invention will be explained in more detail by referring to the drawings showing an embodiment of the present invention.

Figure 1:
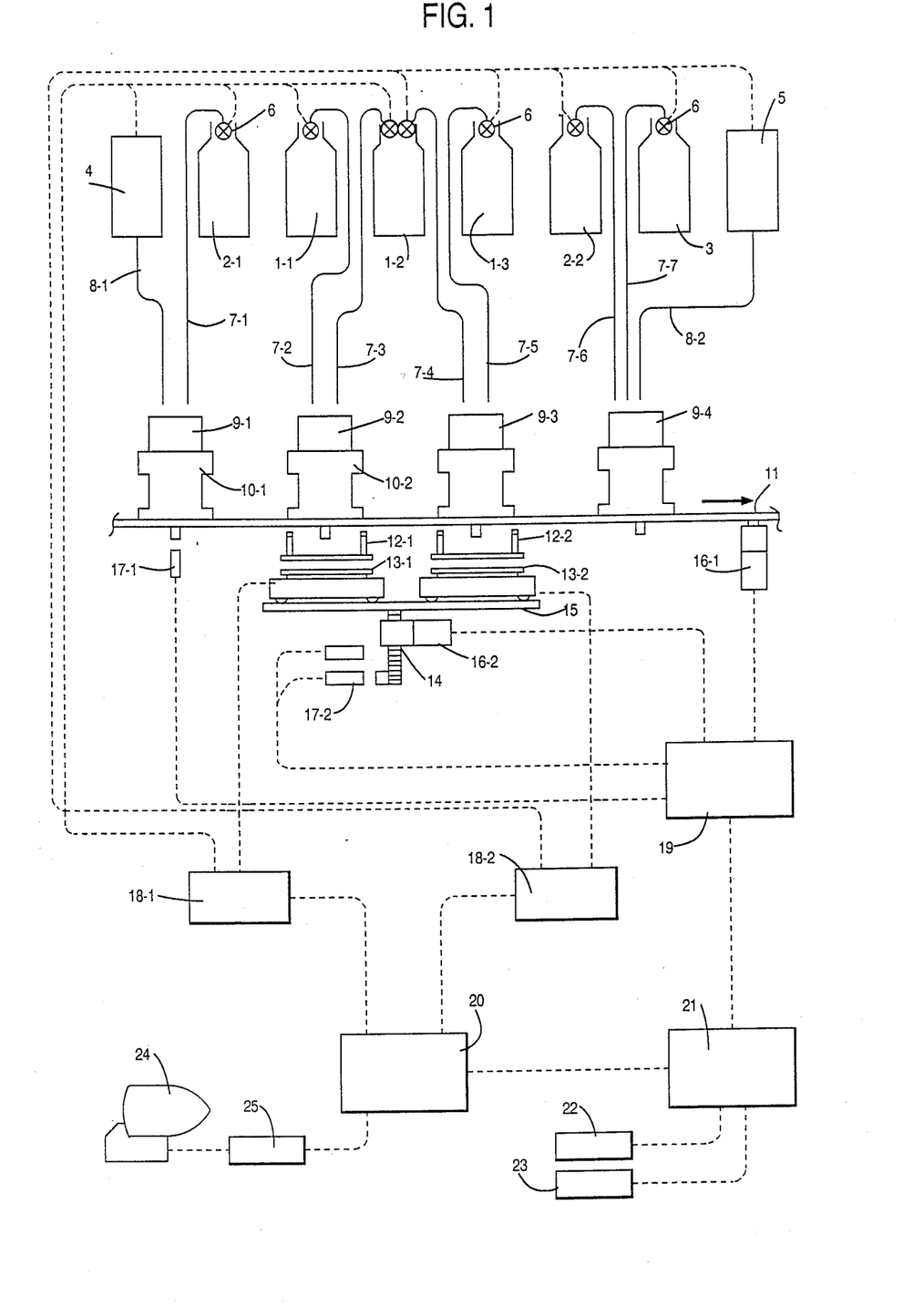
FIG. 1 is a general diagram of a system for automatic dispensation of dye solutions embodying the present invention.

FIG. 1 is a general diagrams of the system for automatic dispensation of dye solutions showing an example with two weighing means of the present invention.

As regards the stock dye solutions there are prepared stock dye solutions (1-1, 1-2, .....) of several different colors. It is possible to prepare stock solutions of the same dye of different concentrations (for example, two kinds of deep and light colors, three kinds of more of deep, middle, light, etc. colors), or to prepare, for each desired color, a plurality of stock dye solutions which are the same color but are different in cost, color fastness, clearness, etc. A stock dye solution of a dye, such as disperse dye, which may settle or precipitate upon standing for a long time, may be stirred by a magnetic stirrer, etc.

Dyeing auxiliaries (2-1, 2-2 ...) including acids such as formic acid, acetic acid, etc.; salts such as Glauber salt, sodium carbonate, sodium acetate, etc.; printing paste (5) etc. may be previously dissolved at desired concentrations to prepare stock auxiliary solutions. However when a low bath ratio is required, they may be supplied in the form of powder (4). In order to adjust the final concentration of the dye solutions, water (3) is provided.

As regards the supply means for the above-mentioed dye solution materials, the liquid materials (stock dye solutions, stock auxiliary solutions, water) are supplied to receiving containers at positions (9-1, 9-2,...) through electromagnetic valves (6) and outflow pipes (7-1, 7-2,....) by the siphon effect, the powder is supplied by powder supply means (8-1) such as a screw feeder or vibration feeder, and the printing paste is supplied by printing paste supply means (8-2) such as a gear pump. It is preferable that, for stock dye solutions of especially high use frequency (1-2,.....), each storage container is connected to a plurality of material supply means (7-3, and 7-4) since it is possible thereby to effect supply to a plurality of receiving containers at positions (9-2 and 9-3) at the same time without increasing the number of the material storage containers and the space required for them. The electromagnetic valve (6) may be provided in the outflow pipe (7) connected to each storage container, but provision of the same at or near the cover of the storage container is more desirable for the prevention of the clogging of the electromagnetic valve, the ease of water-washing of the containers, valves and outflow pipes, the exchange of the outflow pipes, the avoidance of occupation of space by the electromagnetic valves, etc. The material of the outflow pipes (7) is preferably a fluorocarbon resin for providing of flexibility, anticorrosiveness, liquid drop separation, prevention of staining in the pipes, prevention of clogging, etc. In order to make the separation of liquid drops completely at the tip of the outflow pipe, it is desirable to narrow the outlet tip portion of the outflow pipe.

In accordance with the dye solution dispensation (formulation) recipe entered by input device (24) and operation panel (21) and by the electric signals from supply control means (18-1, 18-2), the elctromagnetic valve (6) is opened or closed, and the supply means (8-1, 8-2) are actuated or stopped, and the desired materials are supplied to the receiving containers at positions (9-1, 9-2....).

Each stock dye solution (1) is supplied in a quantity as instructed while its outflow quantity is measured by an electronic balance (13-1. 13-2) which is a weighing means. The number of supply means (7-3, 7-4) for the high use frequency stock solutions correspond to the number of weighing devices. However the stock auxiliary solution (2) and water (3) may be supplied, without being necessarily weighed by the electronic balance, after the receiving containers, before or after the measurement of the stock dye solutions, have been conveyed away from the electronic balances by a transfer means (11). That is to say, to the receiving containers at positions (9-2, 9-3) located above the electronic balances, the stock dye solutions are made to flow, while to the receiving containers at positions (9-1. 9-4) not located above the electronic balances, the stock auxiliary solutions, water, and if necessary, powder and printing paste are supplied at specified positions, respectively. Accordingly it is possible to supply the stock auxiliary solutions, water, and if desired, powder and printing paste at the same time as the supply of the stock dye solutions. Also it is possible to supply the stock dye solutions, water, powder and printing paste, respectively at the same time.

Thus, for the stock dye solutions which require the highest quantitativity in the preparation or dispensation of a dye solution, the electronic balance (13) is used so as to supply the indicated quantity at high precision, and the quantity as instructed of the stock auxiliary solution(s) and water which require less quantitativity in comparison with the stock dye solutions are made to flow at by the regulation of the time of opening and closing of the electromagnetic valves. Furthermore, powder and printing paste are supplied in the quantity as instructed by the regulation of the operation time of the supply means. By the combination of these means, dispensation at high precision and high efficiency is realized.

In one embodiment of the opening and closing of the electromagnetic valve (6) for supplying the stock dye solution (1), 95% of the necessary weight of the stock dye solution of a selected dye color, for example, a yellow dye color, is made to flow out during the open state of the electromagnetic valve (6), and the remaining 5% is made to flow out while the instantaneous opening and closing of the electromagnetic valve is repeated, that is to say, the quantity of the dispensed dye solution is examined frequently until 100% of the necessary quantity is finally supplied.

Of course, in such a method, it is possible to improve the outflow speed or outflow precision by properly selecting the inner diameter, length of the outflow pipe of the stock dye solution (1) or the height from the stock dye solution storage container to the outlet tip of the outflow pipe. For example, it is possible to improve the precision by reducing the inner diameter and/or lengthening the outflow pipe for a dilute stock dye solution. It is also possible to improve the measuring speed by enlarging the inner diameter and/or shortening the outflow pipe of a concentrated stock dye solution.

Among the plural receiving containers, below the containers at positions (9-2, 9-3) for receiving the stock dye solutions (1) (the stock auxiliary solution or water may also be received if desired), are arranged at a predetermined interval, two electronic balances (13-1, 13-2) as the weighing means. The respective information of the weights measured by the electronic balances are transmitted as electric signals to the respective supply control means (18-1, 18-2), and, if desired, may be output at the same time as weighing and fed to a display (22) or printer (23) so that it becomes possible to confirm or record the measurement results.

At the time of measurement of the weight of the receiving container (9) and the weight of the stock dye solution supplied to the container, the electronic balance (13) is lifted by a rack-pinion mechanism (14) functioning as an elevating means (which will be explained later), and the receiving container is placed on the electronic balance. After the completion of the weighing and dispensation the electronic balance goes down to the original position. Thus, since the system of the present invention performs weight measurement by the movement of the electronic balance, it has a simple structure as compared with, for example, a system wherein the balance is fixed and the transfer means on which a plural number of containers are placed is moved up and down, or a system wherein receiving containers are mechanically moved onto the balance. Moreover, there is no liquid leakage caused by vibration etc. of the object to be weighed, and the weighing can be carried out at a high speed. Therefore, the weighing system of the invention is an efficient one.

Next, the rack-pinion mechanism used as the lifting and lowering means for the electronic balance (13) will be explained. The electronic balance (13) is fixed to the frame (15) which in turn is moved up and down by the rack-pinion mechanism (14). In this example, a rack-pinion mechanism used as the lifting and lowering mechanism is shown. However, any other lifting and lowering means which can move the electronic balance upwardly or downwardly for a predetermined distance may be employed. For example, a hydraulic mechanism, an air pressure mechanism or a screw mechanism can also be used.

The rack-pinion mechanism (14) is combined with a motor (16-2) provided with a brake mechanism and the pinion is rotated by electric signals from position control means (19). The pinion is engaged with the rack having the frame (15) on its upper end, and the rack is moved up and down by the rotation of the pinion. In order to control the distance of the up-and-down movement of the electronic balance (13), the detection end of a position sensor (17-2) is provided at the lower end of the rack to transmit electric signals to position control means (19) representing the positions sensed by the position sensor.

When the weight measurement has been accomplished as described above, the receiving container is transferred to a predetermined position, and the material is supplied to another receiving container. In the following, a transfer means will be explained.

Figure 4:
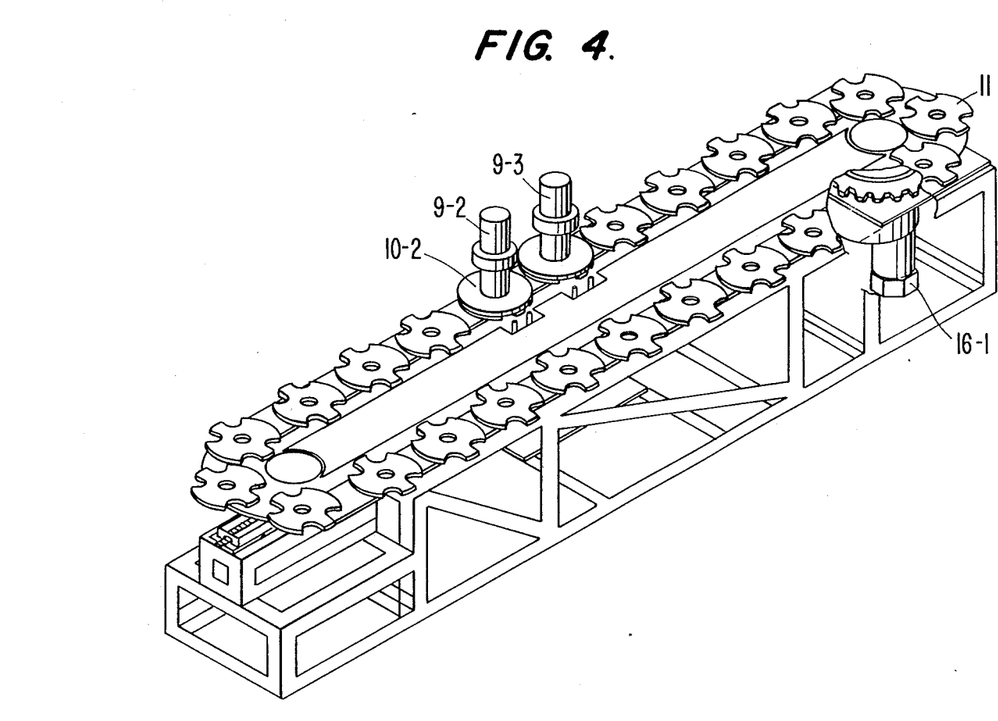
FIG. 4 is a perspective view of a rotary conveyor.

A plurality of receiving containers as shown at (9-1, 9-2....) are placed respectively on respective adapters as shown at (10-1, 10-2....) on a horizontal rotary conveyor (11) as a transfer means. The rotary conveyer (11) is shown in detail in FIG. 4 as an example of transfer means, but any other means may be employed which can hold a plurality of receiving containers on a plane and transfer or convey them along the plane of the conveyor. For example, a rotary table may be employed.

Figure 3A:
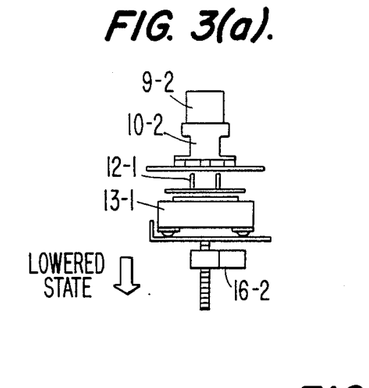
FIGS. 3a and 3b are diagrams showing the states of the weighing devices.
Figure 3B:
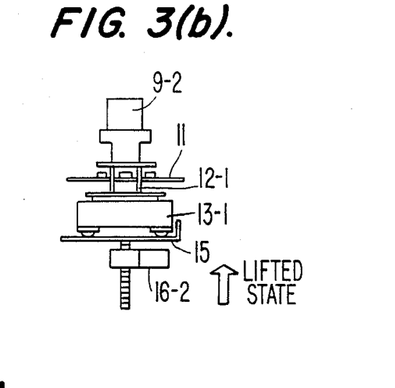
Figure 3C:
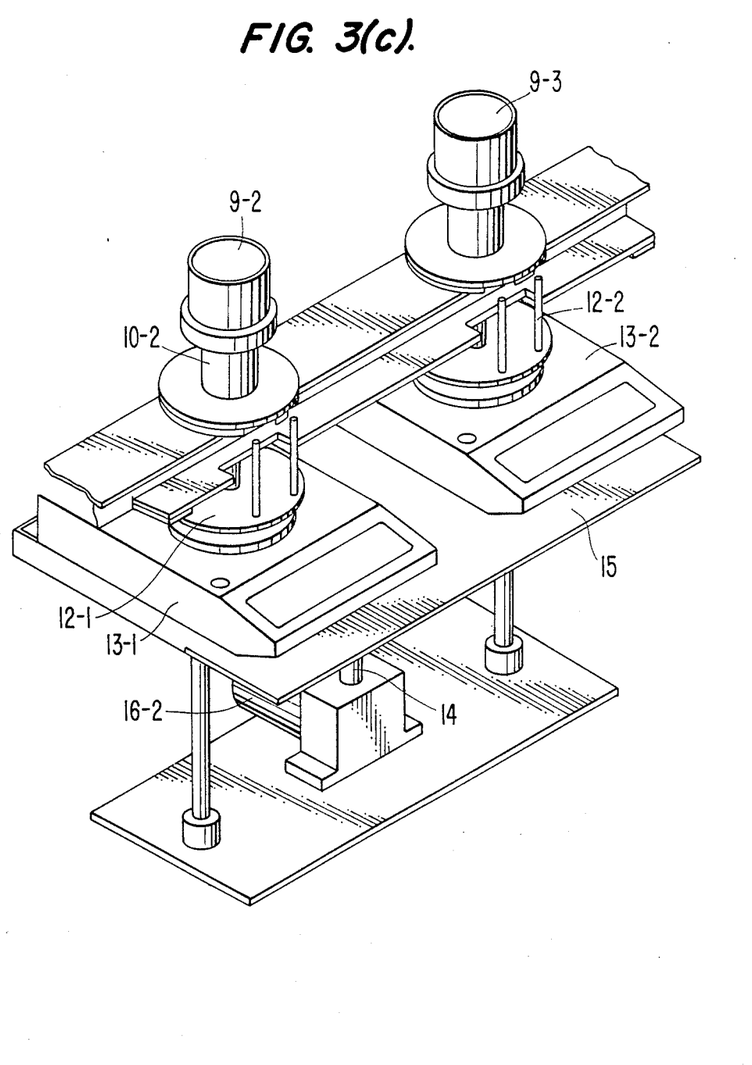
FIG. 3c is a perspective view of a conveyor and the weighing devices.

The use of the adapter is not always necessary, but it is desirable to employ them since suitable dyeing pots, beakers, etc. can be used without putting any limitation on the shape of receiving containers by placing adapters on the rotary conveyor in which the receiving containers are placed, and by the upward or downward movement of the weighing means and supporting stands (12-1, 12-2,......) thereon which move upwardly to engage the adapter thereabove and lift it from the conveyor as the weighing means is raised, and vice versa, as shown in FIGS. 3a and 3b, placing or releasing the receiving containers on or from the weighing means can be easily conducted. One specific example of the relation is shown in FIG. 3c in which the adapters (10-2) overhang the edge of the conveyor to be engaged by the rising stands (12-1, 12-2).

The horizontal rotary conveyor (11) is rotated by a motor (16-1) which is provided with a brake mechanism and which responds to the position sensor (17-1) and is actuated and stopped by electric signals from the position control means (19) to stop the receiving containers at desired positions and to transfer them.

In the automatic preparation or dispensation of dye solutions, the input device (24) can be operatively connected directly with a color matching device (not shown), or input may be done through records such as paper tapes, magnetic tapes, or magnetic disks recorded from the color matching device, or recorded numerals may be directly entered by keyboards attached to the input device.

Figure 2A:
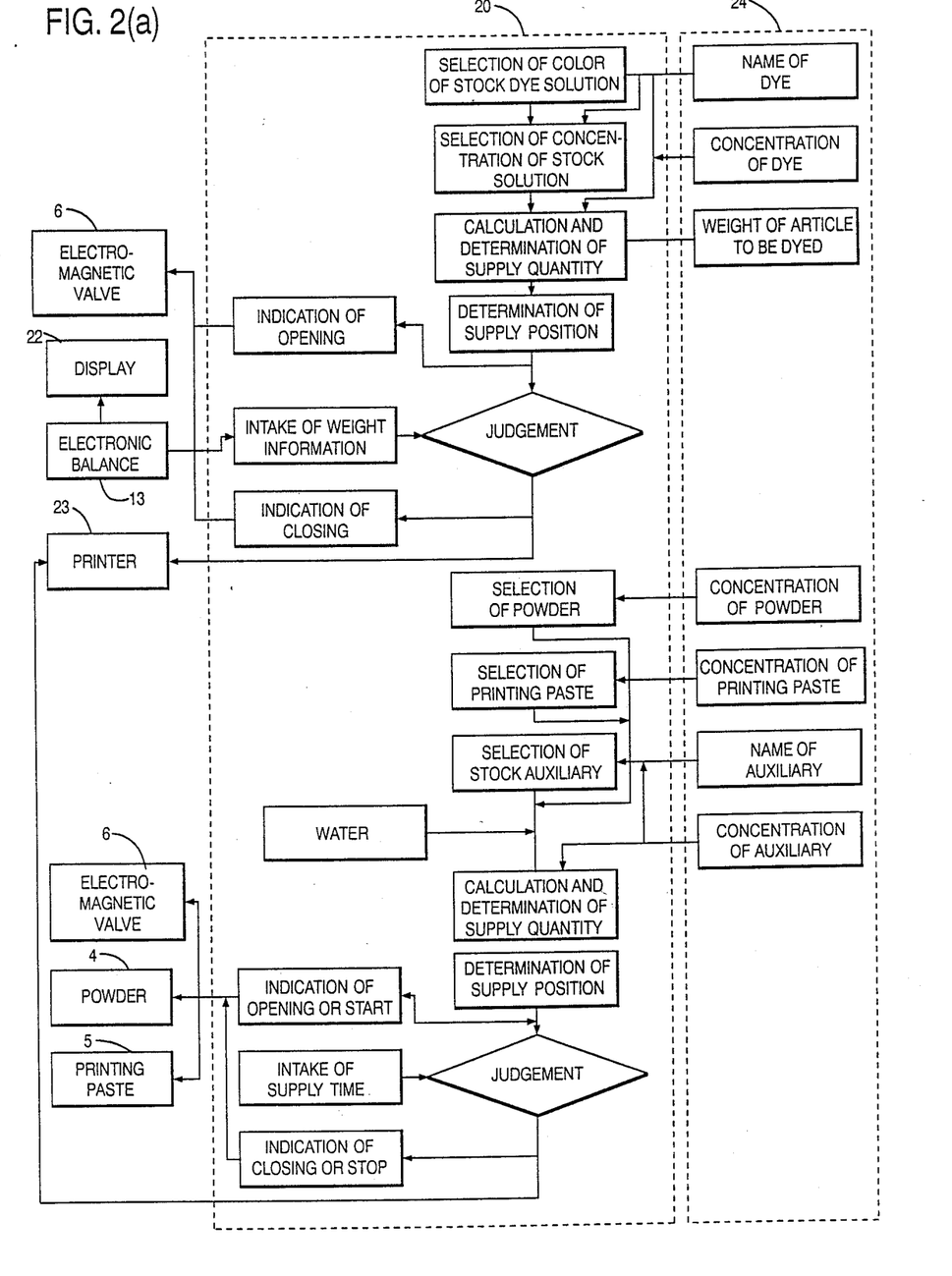
FIG. 2 is a block diagram showing the control part of the system.
Figure 2B:
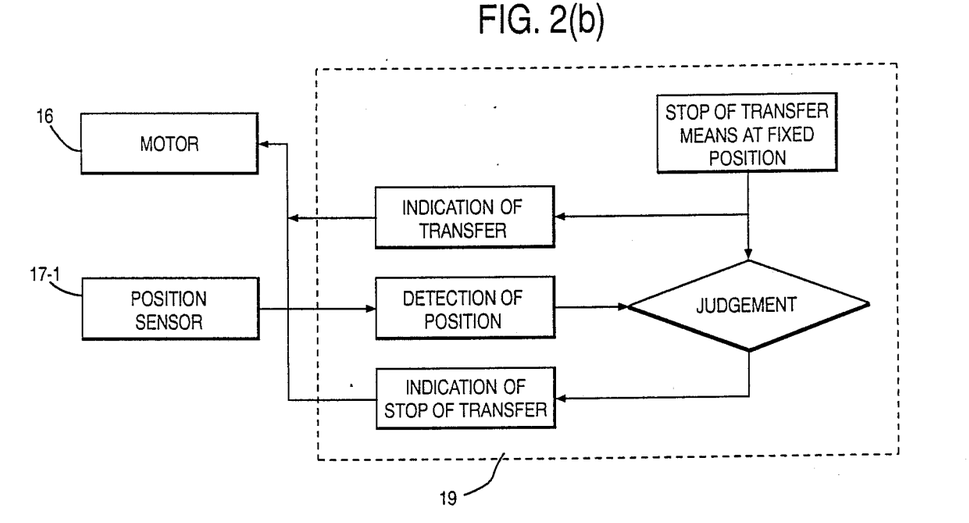
Figure 2C:
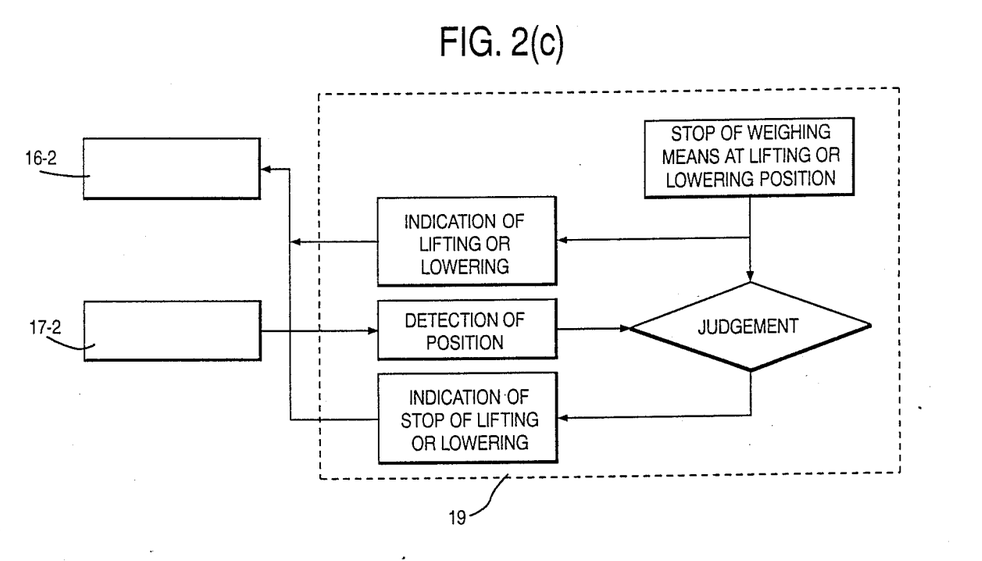

FIG. 2 is a block diagram of the control part of the system showing an example of the present invention. In the following, the operation of the system for automatic dispensing of dye solutions shown in FIG. 1 will be explained by referring to these block diagrams.

First, if there are a dyeing auxiliary (2-1) and water to be supplied, they are supplied to a receiving container when it is in the position shown by (9-1), and thereafter the container is transferred to the position of (9-2). The adapter on the rotary conveyor (11) at (10-2) is positioned on the conveyor above the electronic balance (13-1) at a predetermined distance from said electronic balance and the adapter and the receiving container held thereon are placed on the electronic balance --(13-1) when the electronic balance is lifted by the rackpinion mechanism and the support (12-1) engages the adapter to raise it and the container from the rotary conveyor (11), as shown in FIGS. 3a and 3b, and then the measurement of the weight (the tare) takes place. Subsequently, on the basis of the input for the first recipe of dye solution, the positions from wchich the respective ones of a plurality of dye solution materials necessary, to be dispensating are determined so that the measurement (weighing) loads (dispensation time, number of materials, etc.) of the plural electronic balances to be used can become as uniform as possible. Subsequently, by opening and closing the electromagnetic valve (6), the indicated quantity of the indicated material is supplied to the first receiving container at position (9-2). After the completion of the supply and weighing of the material (of which the supply position is determined) corresponding to the instructed value, the electronic balance (13-1) is lowered and the adapter and the receiving container at the position of (10-2) and (9-2) are placed on the rotary conveyor (11) and no longer supported on the electronic balance (13-1).

After the completion of the first supply and weighing of the dye solution materials for the first of the the number of the electronic balances to be used, the receiving container from position (9-2) is transferred and is placed on the next electronic balance (13-2). Then the container is subjected to the second supply and weighing, and at the same time, the next receiving container is moved to position (9-1) and placed on the first electronic balance (13-1) and is subjected to the first supply and weighing of the dye solution material according to the second dispensing recipe. It will be noted that a dye stock solution (1-2) having a high frequency of use can be supplied to containers at both positions ((9-2) and (9-3). In the same way as above, the cycle of [I] setting the receiving container in a fixed position, [II] placing the receiving container on the electronic balance, [III] supplying the material to the predetermined receiving container and weighing the material, [IV] releasing the receiving container from the electronic balance, and [V] transferring the receiving container, is repeated for the number of the electronic balances to be used, and thereafter, if any dyeing auxiliary (2-2) or water (3) remains to be supplied, they are supplied at the position (9-4) whereby the dye solution dispensation into the first receiving container is completed, and at the same time therewith, the dye solution dispensation in the second and the following receiving containers will proceed one after another.

In the foregoing, we have explained the method wherein one preparation or dispensation of the dye solution is divided over the number of the electronic balances to be used, and wherein which dye solution should be supplied when the receiving container is located at which position, is determined, completing the process in a succession of steps. However it is also possible to complete the dye solution dispensation steps of the number of balances, for each receiving container placed on each electronic balance, each independently and at the same time in parallel. In this case, it is necessary to prepare material storage containers or material supply means for each material for each of the number of the electronic balances. Therefore, the former method is preferable in respect of equipment space and economy.

Incidentally, when a sample piece to be dyed such as a textile product is attached to the outer side of the receiving container of a known weight, and placed on the transferring means of the present invention, and the dyeing condition data is input, then the weight of the sample piece will be measured automatically. On the basis of this weight, a dye solution can be prepared automatically. Thus dyeing testing can be done by putting the test sample into the dye solution. By this method there is no need of previously weighing definite weights of plural samples to be dyed. Also, there will be no erroneous operation such as erroneously putting another sample in the dyeing test. Thus, anyone, not just those skilled or experienced, can conduct automatic dispensing at high precision and at high efficiency.

Thus, on the basis of the input information entered about the name of dye, dye concentration, quantities of dyeing auxiliaries (acid, salt, printing paste, etc.), and the weight of the product to be dyed, the microprocessors (18, 19, 20) used as the control means are caused to conduct the selection of the dye solution, the calculation and determination of flowed out or dropped stock dye solutions, the determination of the opening and closing time of the electromagnetic valves, the quantitative supply of powder and printing paste, the determination of the positions of material supply, etc. At the same time, the microprocessors are caused to take in at any time the signals from the electronic balance (13) used as the weighing means to compare them with the predetermined values of the weight of the flowed out or dropped stock dye solution, thus to make possible proper control of the opening and closing of the electromagnetic valve (6). Furthermore, the control of the printer (23) and display (22) which input, display and record the actual measurement values immediately, may be performed by the microprocessors. The order and control of the motor and brake mechanism (16-1) and the position sensor (17-1) which operate and control the rotation of the rotary conveyer (11), and the motor and brake mechanism (16-2) and the position sensor (17-2) which operate and control the movement of the electronic balance (13) up and down, may also be performed by the microprocessors.

By using such microprocessors as various control means of the system for the automatic dispensation of dye solutions according to the present invention, and by providing the software to perform the whole control, the system of the present invention can be used for the dispensation of various dye solutions, and moreover this prevents the design of the mechanical parts from becoming rigid and fixed.

The above-described system for automatic dispensation of dye solutions of the present invention utilizes a plurality of weighing means efficiently, and according to the input dispensation recipe the system makes it possible to automatically dispense a plural number of various kinds of dye solutions, one after another, without any problem in dispensing precision, time and labor.

Another characteristic advantage of the present invention is that a plural number of weighing means are provided together with two or more material supply means, and by using such weighing means efficiently, the range of dye solutions that can be dispensed and the dispensing speed are increased to a maximum, even under a restriction on costs and floor-space.

Moreover, even during the weighing of a stock dye solution with the electronic balance, the system of the present invention is able to supply indicated quantities of a stock dyeing auxiliary solution, water, and if desired, powder and printing paste into the receiving container and another position, and the system makes is possible to shorten the dispensing time greatly without impairing the dispensation precision, and at the same time, makes it possible to dispense a dye solution conditioned on a low bath ratio or a dye solution for printing use.

Since the system of the present invention dispenses indicated quantities by a weight method, there are no errors resulting from variations of liquid temperature, and since it enables anyone to dispense with a good precision, without any necessity of experience and skill as in handwork, there are no artificial errors. Furthermore, the measurement results can be easily confirmed by the print-out and digital display.

What I claim is:

1. In a system for automatic dispensing of a plurality of dye solution materials including stock dye solutions, dyeing auxiliaries, water and the like, the improvement comprising a system for the automatic dispensing of stock dye solutions, comprising:

transfer means for intermittently transferring receiving containers to and stopping the receiving containers at a succession of filling positions, at least two of which are stock dye solution filling positions;

a plurality of weighing means, one of each of said stock dye solution filling positions, for converting weight changes of the materials supplied to receiving containers at said stock dye solution filling positions to electric signals, and lifting and lowering means for the plurality of weighing means for simultaneously moving the weighing means up and down for raising the receiving containers off said transfer means, whereby only the weight of a receiving container is on each weighing means;

a plurality of material storage containers including at least one stock dye solution storage container;

a material supply means extending from each of said material supply containers to a respective one of said filling positions, said stock dye solution storage container having at least two material supply means extending therefrom to said at least two stock dye solution filling positions; and control means connected to said material supply means, to said weighing means and to said transfer means for transferring a receiving container to the first stock dye solution filling position, lifting the weighing means at said first stock dye solution filling position for raising the receiving container off said transfer means, controlling the quantities of material supplied from said material supply containers to the receiving container at the stock dye solution filling position according to the particular mixture of materials desired in the respective receiving container in response to the weight of the receiving container sensed, then lowering the weighing means to place the receiving container on the transfer means, moving the receiving container to the next filling position in the succession of filling positions while moving a further receiving container into the firstmentioned stock dye solution filling position, repeating the controlling step for the respective receiving containers, and,if desired, when a receiving container is in the second stock dye solution filling position, controlling said material supply means for supplying stock dye solution from said at least one stock dye solution container to both stock dye solution filling positions.

2. The system as claimed in claim 1 wherein the transfer means of the receiving containers is a rotary conveyor.

3. The system as claimed in claim 1 wherein the lifting and lowering means for moving the weighing means is in the form of a rack-pinion mechanism.

* * * * *